July 5, 1932.   J. G. HODGE   1,865,566
PISTON PACKING
Filed Feb. 20, 1929
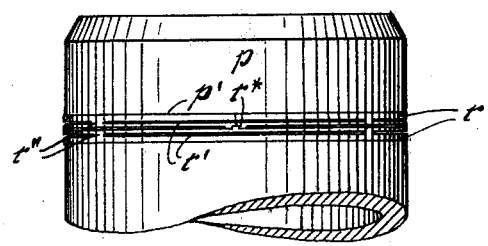
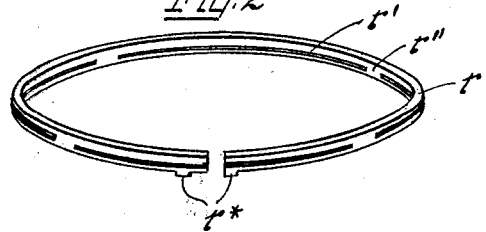
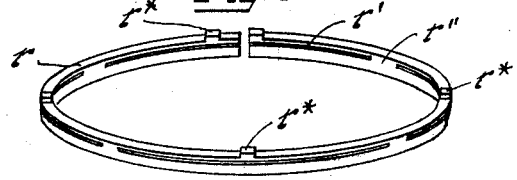
Inventor:
James G. Hodge
by P. Peale Herrick
Attorney.

Patented July 5, 1932

1,865,566

UNITED STATES PATENT OFFICE

JAMES G. HODGE, OF EAST ORANGE, NEW JERSEY, ASSIGNOR TO THE SIMPLEX PISTON RING COMPANY OF AMERICA, INCORPORATED, OF CLEVELAND, OHIO, A CORPORATION OF OHIO

PISTON PACKING

Application filed February 20, 1929. Serial No. 341,447.

My invention relates to improvements in piston packing, and more particularly to coacting piston packing rings assembled in units of resilient type, and slightly and individually expansible within the piston cylinder; the object of said invention being the production of a piston packing that will be highly effective under all conditions and self compensating for wear.

In Letters Patent of Great Britain, Lockwood, No. 5,096 of 1896, there is shown and described a type of resilient piston packing employing an expansion member with spacing parts coacting with a circumferentially split ring, and in Lockwood, No. 24,993 of 1898, there is shown and described a resilient packing comprising a single circumferentially split ring having two series of saw cuts in staggered relation within its integral body.

The present invention relates to the same general type of resilient metallic packing, i. e., comprising units assembled from a plurality of members that are axially resilient with respect to the piston; said units being in staggered relation and individually expansible within the piston grooves, in order to insure better compensation for wear and/or irregularities in the cylinder.

The features of my improvement may be better explained by making reference to the accompanying drawing illustrating a specific type or types of axially resilient metallic piston packing embodying my invention, wherein:

Figure 1 is a fragmentary view, in elevation illustrating a portion of a piston somewhat diagrammatically, with a set of coacting piston rings positioned in the upper groove thereof;

Figs. 2 and 3 are perspective views of two coacting piston ring members, illustrated in position for assemblage;

Fig. 4 is an enlarged view in elevation of the assembled piston ring or piston packing unit, and Fig. 5 is a similar view of a modified structure.

Throughout the several figures of the drawing I have employed the same character of reference to indicate similar parts.

Instead of forming the resilient metallic packing of an integral saw cut member, as has heretofore been done, it will be seen that my packing comprises a plurality of coacting members that produce the desired expansion and resilience, that together with wide displacement of the split ends, afford a most effective annular seal between the piston and cylinder walls.

Although my improved piston packing may be formed of a plurality of terminally split, but specially formed piston rings, my usual practice is to assemble each unit from two split annular members; one or both of which is circumferentially saw cut at intervals, and both of said members are provided with spacing lugs. These spacing lugs are characteristic of my instant improvement, and contribute to the axial resilience of the unit as will appear.

In the upper groove $p'$ of the fragmentary showing of piston $p$, Fig. 1 there are assembled two of the rings, shown upon a slightly larger scale, Figs. 2 and 3, in separated relation, and upon a still larger scale, Fig. 4 in assembled relation. Each of these rings $r$, $r$, is provided with spaced circumferential saw cuts $r'$ separated by solid portions $r''$, while one face of each ring is provided with lugs $r^*$, staggered with respect to portions $r''$. When assembled in a set, the lugs adjacent to the split ends of the upper ring are adapted to embrace an intermediate lug at 180° displacement, as indicated, thereby preventing the circumferential shifting of the rings within the groove, when positioned therein.

It will be seen that the assemblage of two rings, separated by the integral spacing lugs $r^*$ affords a piston packing of independent circumferentially expansible members with the split ends in widely displaced relation. Moreover, the unit thus assembled is axially resilient, comprising three circumferential slitted zones in staggered relation, while the unit is made of slightly greater width than the groove $p'$, into which the ring members are resiliently mounted, as well as in the multiple grooves of the piston, not shown, as in ordinary practice.

The resilient unit of Fig. 5 is similar in principle to the one above described, except for the provision of two, as opposed to three, sets of staggered slits and solid portions, in effect. Thus, the upper ring member is provided with a body portion $r$ having a plane upper face and spacing lugs $r^*$ on its lower face. This, in conjunction with a circumferentially slit ring member, such as shown in Fig. 2, reversed to form the lower member of the resilient unit, affords necessary axial resilience.

It is common practice to employ expander rings interiorly of the piston grooves to supplement the peripheral expansion of the ring sections, which practice may also be availed of, if desired to insure a greater resiliency, without departing from the intent or spirit of my invention.

Having now described preferred embodiments of my invention, I claim and desire to secure by Letters Patent, together with such modifications as may be made by those ordinarily skilled in the art, the following:

1. The combination with a grooved piston, of an axially resilient metallic packing having greater width than and positioned within the groove, comprising a plurality of transversely split ring members disposed with their split ends in displaced relative position, each of said members having spacing lugs provided upon their juxtaposed faces, and one of said members having a body portion with a series of circumferential saw cuts in staggered relation with the spacing lugs, substantially as set forth.

2. The combination with a grooved piston, of an axially resilient metallic packing having a greater width than and positioned within the groove, comprising a plurality of transversely split ring members disposed with their split ends in displaced relative position, one of said members having spacing lugs integral with the body, and one of said members having a body portion with a series of circumferential saw cuts in staggered relation with respect to the spacing lugs in the assembled unit, substantially as set forth.

3. A piston ring consisting of two sections, one of which has a series of circumferential slots, and the other of which has enlargements at one of its edges opposite said slots, to compress the ring axially when assembled.

In testimony whereof I do now affix my signature.

JAMES G. HODGE.